United States Patent

Choi

[11] Patent Number: 5,939,710
[45] Date of Patent: Aug. 17, 1999

[54] OPTICAL PICKUP SYSTEM INCORPORATING THEREIN A BEAM SPLITTER HAVING A PHASE LAYER

[75] Inventor: Yang-Oh Choi, Seoul, Rep. of Korea

[73] Assignee: Daewoo Electronics Co., Ltd., Seoul, Rep. of Korea

[21] Appl. No.: 08/939,885

[22] Filed: Sep. 29, 1997

[30] Foreign Application Priority Data

Sep. 30, 1996 [KR] Rep. of Korea ............... 96-43083
Sep. 30, 1996 [KR] Rep. of Korea ............... 96-43084

[51] Int. Cl.$^6$ ......................................... G11B 7/00
[52] U.S. Cl. ............... 250/225; 250/201.5; 369/112; 369/44.23
[58] Field of Search ................ 250/225, 201.5; 369/110, 112, 44.23, 44.24

[56] References Cited

U.S. PATENT DOCUMENTS 5,331,622  7/1994  Ernst et al. ................ 369/112

FOREIGN PATENT DOCUMENTS

| 0225564 | 6/1987 | European Pat. Off. |
| 0412716 | 2/1991 | European Pat. Off. |
| 0509526 | 10/1992 | European Pat. Off. |
| 0601862 | 6/1994 | European Pat. Off. |
| 0722167 | 7/1996 | European Pat. Off. |
| 63-69325 | 11/1988 | Japan. |
| 04325936 | 11/1992 | Japan. |
| 2059057 | 4/1981 | United Kingdom. |

OTHER PUBLICATIONS

"Magneto–Optic and Phase Change Optical Head Design for Optical Storage" IBM Technical Disclosure Bulletin, vol. 38, No. 5, May 1995, pp. 403–406.

*Primary Examiner*—Edward P. Westin
*Assistant Examiner*—Kevin Pyo
*Attorney, Agent, or Firm*—Pennie & Edmonds LLP

[57] ABSTRACT

An optical pickup system reads an information signal stored on a recording surface of an optical disk. The optical pickup system comprises a light source for generating a light beam including a P and an S polarization component with a wavelength $\lambda_1$, a ¼$\lambda$ plate for changing the polarization component of the light beam transmitted therethrough, an optical detector for detecting the information signal off the optical disk, an astigmatic lens for generating an astigmatic aberration when a light beam transmits therethrough and a beam splitter, provided with a base and a phase layer, wherein the phase layer is formed by coating a first and a second material alternatively for reflecting each of the polarized light components into different directions, respectively, and the refractive index of the first material for the P-polarized light component is different from that of the second material for the S-polarized light component, thereby allowing the optical pickup system to read the information signals off the recording surface.

14 Claims, 2 Drawing Sheets

OPTICAL PICKUP SYSTEM INCORPORATING THEREIN A BEAM SPLITTER HAVING A PHASE LAYER

FIELD OF THE INVENTION

The present invention relates to an optical pickup system; and, more particularly, to an optical pickup system with a size reduced by incorporating therein a beam splitter having a phase layer.

DESCRIPTION OF THE PRIOR ART

One of the common problems in an optical information recording disk, e.g., laser disk, is related with the occurrence of focusing errors and there has been introduced an astigmatic method to solve the problem.

In FIG. 1, there is illustrated a prior art optical pickup system 100 utilizing the astigmatic method, as disclosed in U.S. Pat. No 4,023,033, entitled "Optical Focusing Device" and is incorporated herein by reference. The optical pickup system 100 comprises a light source 110, a beam splitter 120, an objective lens 130, an optical information recording disk 140 (hereinafter, referred to as an optical disk), a cylindrical lens 150 and an optical detector 160. In the system 100, a light beam 112 emitted from the light source 110, e.g., a laser diode, falls on the beam splitter 120 and is partially reflected by a reflection surface 122 incorporated therein. The light beam reflected from the reflection surface 122 is focused through the objective lens 130 on a recording surface 144 of the optical disk 140 as a focused light beam. The focused light beam reflected from the optical disk 140 is converged by the objective lens 130 and partially transmitted through the beam splitter 120, made astigmatic by its passage through the cylindrical lens 150 and thereafter impinges onto a light-reception surface 162 of the optical detector 160, wherein the light-reception surface 162 is divided into four square photoelectric cells (not shown) arranged to form a square. Each of the photoelectric cells generates an output in the form of a light intensity measurement. Two outputs from two photoelectric cells located diagonally opposite from each other in the square light-reception surface are sent to a first adder and those from the other two photoelectric cells are sent to a second adder, respectively. Results from the first and the second adders are then sent to a differential amplifier (not shown) which will in turn generate an associated focusing error by comparing the two outputs from the first and the second adders, the focusing error simply being a difference between the two outputs from the pair of adders.

Being astigmatic, the image shape of the luminous flux on the light-reception surface 162 of the optical detector 160 changes depending on the relative position of the recording surface 144 of the optical disk 140 with respect to a convergence point 142 of the light beam. In order to detect the change in the image shape of the luminous flux, the cylindrical lens 150 is positioned between the convergence point 142 and the optical detector 160 in such a way that the image shape of the luminous flux on the light-reception surface 162 becomes circular when the light beam is exactly focused (zero focusing error) on the recording surface 144 and this is known as a "just focused" position in the art. If the optical disk 140 is moved along an optical axis drawn between the just focused position and the center of the objective lens 130, the focusing error signal becomes non-zero with a sign indicating the direction of the displacement of the recording surface 144 of the optical disk 140 from the "just focused" position, thereby detecting the focusing error.

One of the major shortcomings of the above-described optical pickup system 100 is a large size thereof due to the locations of the cylindrical lens 150 and the optical detector 160 which are placed opposite side of the optical disk 140 with respect to the beam splitter 120, thereby making the overall size of the optical pickup system 100 bulky.

SUMMARY OF THE INVENTION

It is, therefore, a primary object of the present invention to provide an optical pickup system having a reduced size with a simpler structure.

In accordance with the present invention, there is provided an optical pickup system for reading information signals stored on an optical disk, said system comprising: a light source for generating a light beam including a first and a second polarization component; a ¼λ plate for changing the polarization component of the light beam transmitted therethrough; and a beam splitter for reflecting the first polarization component to a direction of the optical disk through the ¼λ plate and reflecting the second polarization component to the other direction to thereby the first polarization component be used for reading the information signals off the optical disk.

BRIEF DESCRIPTION OF THE DRAWINGS

The present invention together with the above and other objects and advantages will become apparent from the following description of preferred embodiments, when read in conjunction with the accompanying drawings, wherein.

DETAILED DESCRIPTION OF THE PREFERRED EMBODIMENTS

Figure 1:
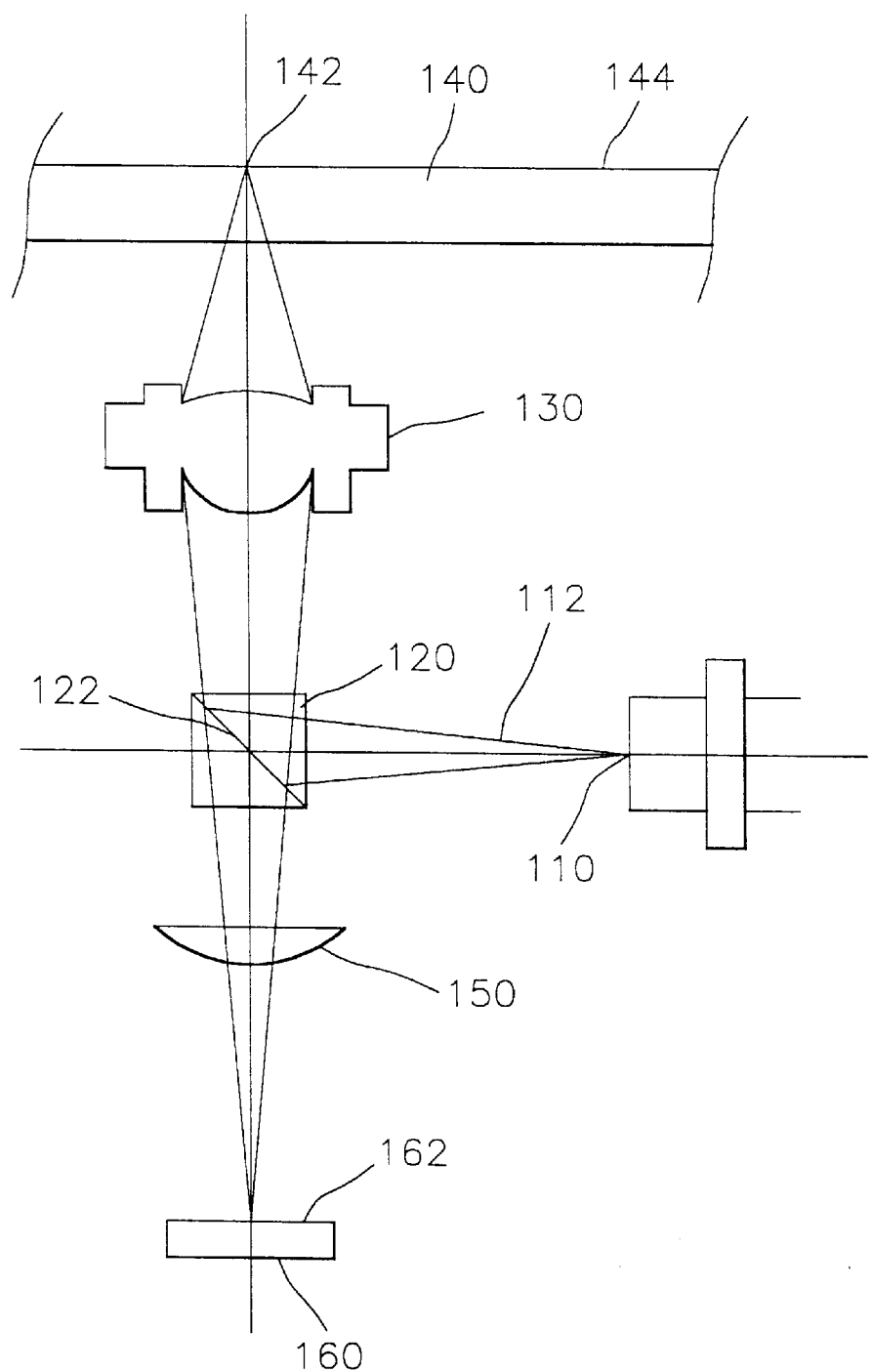
FIG. 1 represents a schematic side view of a prior art optical head.
Figure 2:
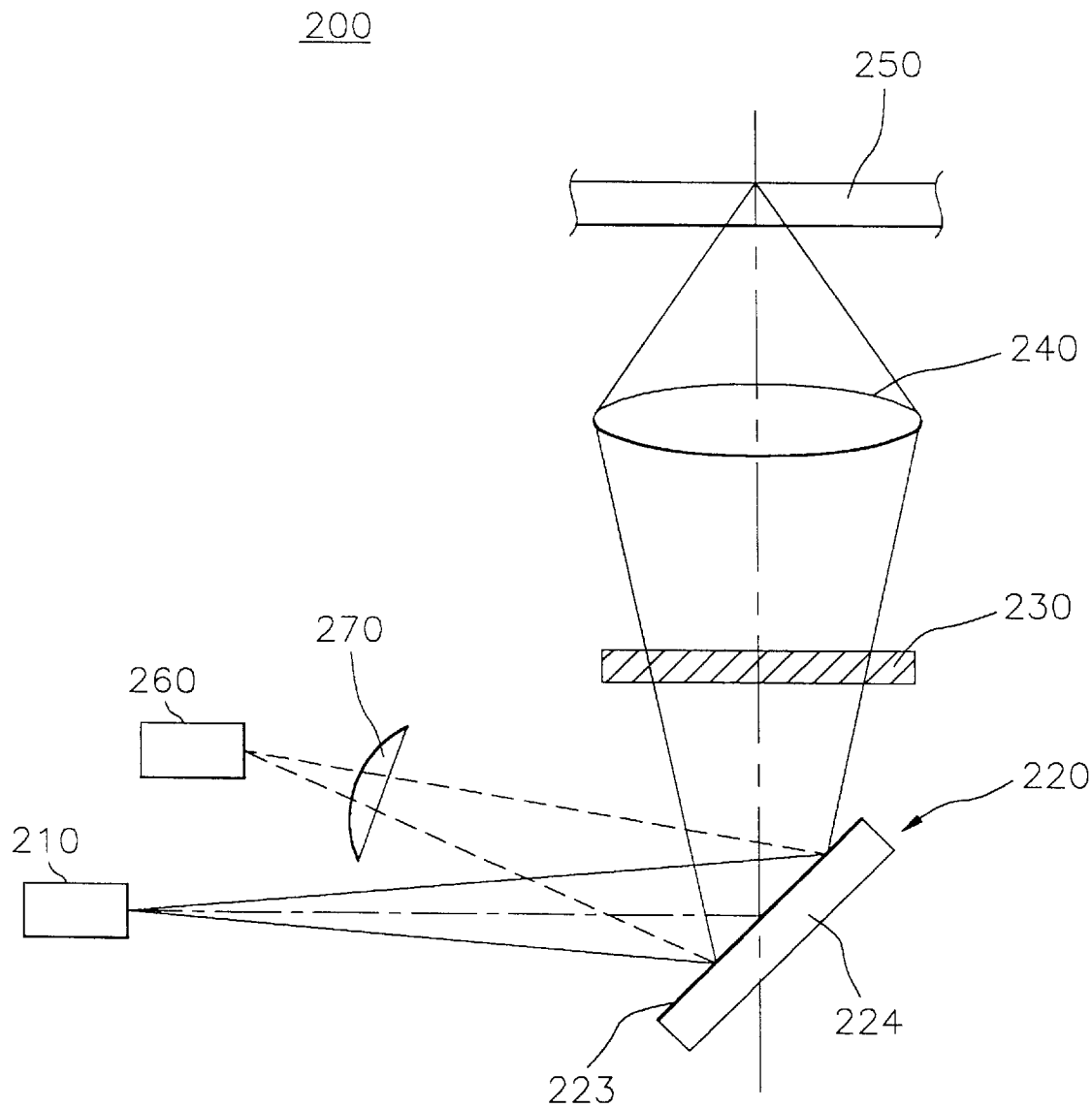
FIG. 2 represents a schematic side view of an optical pickup system utilizing an inventive beam splitter in accordance with the present invention.

In FIG. 2, there is illustrated a schematic side view of the inventive optical pickup system 200 in accordance with the present invention comprising a light source 210, e.g., a semiconductor laser or a laser diode, for generating a light beam including a P- and an S-polarized light component with a wavelength $\lambda_1$, a ¼λ plate 230, an objective lens 240, an optical detector 260, a cylindrical lens 270 and a beam splitter 220 provided with a base 224 transparent to the light beam and a phase layer 223, wherein the beam splitter 220 may be produced, e.g., by depositing on top of the base 224 the phase layer 223 provided with a first and a second material, alternatively, wherein the refractive index of the first material for the P-polarized light component is different from that of the second material for the S-polarized light component, thereby the phase layer 223 producing a phase angle difference between the P- and S-polarized components impinged thereon.

The objective lens 240, the ¼λ plate 230 and the beam splitter 220 are so arranged that the ¼λ plate 230 is disposed between the objective lens 240 and the beam splitter 220, and an optical axis connecting a focal point of the objective lens 240 and the center of the objective lens 240 passes through the center of the ¼λ plate 230 and also meets the phase layer 223 of the beam splitter 220 at a predetermined angle. The light source 210 is placed at a position such that the P-polarized component of the light beam therefrom converged by the objective lens 240 after first being reflected from the phase layer 223 and then transmitted through the ¼λ plate 230 will be focused at a point along the optical axis.

When the light beam emanating from the light source 210 falls on the beam splitter 220, the phase layer 223 of the beam splitter 220 reflects the P- and the S-polarized light components into different directions, respectively, due to the phase angle difference between the P- and S-polarized components impinging thereon, wherein the light beam is aligned along a first line connecting the light source 210 with an intersecting point of the optical axis with the phase layer 223 of the beam splitter 220. The phase layer 223 is so designed that it reflects the P-polarized light component in the direction of the objective lens 240 through the ¼λ plate 230, but that it reflects the S-polarized light beam into different direction to thereby deflect the S-polarized light component away from the direction of the objective lens 240, making the S-polarized light component useless in reading information signals stored on an optical disk 250. And then, the objective lens 240 focuses the P-polarized light component impinging thereon on the recording surface of the optical disk 250. Thereafter, the P-polarized light beam reflected from the recording surface of the optical disk 250 is first converged by the objective lens 240, is then transmitted through the ¼λ plate 230, thereby being converted into an S-polarized light beam. The S-polarized light beam converted from the P-polarized light beam will be reflected by the phase layer 223 of the beam splitter 220 into a different direction from the direction to the light source 210. The converted S-polarized light beam reflected by the beam splitter 220 is represented by dotted lines in FIG. 2, wherein the center of the optical detector 260 is positioned at a focusing point of the converted S-polarized light beam reflected from the phase layer 223 of the beam splitter 220. The converted S-polarized light beam passes through the cylindrical lens 270, thereby changing the converted S-polarized light component into an astigmatic light beam, and thus enabling the optical detector 260 to detect a focusing error signal by using an astigmatic method. The angle between a second line and the first line is smaller than 90 degrees, wherein the second line is formed by connecting the center of the optical detector 260 with an intersecting point of the optical axis with the phase layer 223. Further, the optical detector 260 is disposed between the light source 210 and the objective lens 240, thereby reducing overall size of the optical pickup system 200. The optical path of the converted S-polarized light beam from the phase layer 223 of the beam splitter 220 to the optical detector 260 becomes equal to the optical path from the light source 210 to the phase layer 223 of the beam splitter 220.

The optical detector 260 is capable of measuring the intensity of a light beam detected thereon. The astigmatic light beam, i.e., the converted S-polarized light beam that passes through the cylindrical lens 270 after being reflected from the phase layer 223 of the beam splitter 220, falls onto the optical detector 260, thereby allowing the optical pickup system 200 to reproduce the information signal off the recording surface of the optical disk 250.

In comparison with the prior art optical pickup system 100, the inventive optical pickup system 200 has a simpler structure. This is achieved by incorporating therein the beam splitter 220 having a phase layer 223 formed by coating a first and a second material alternatively for reflecting each of the polarized light components into different directions, respectively, wherein the refractive index of the first material for the P-polarized light component is different from that of the second material for the S-polarized light component, thereby reducing the longitudinal size in the optical pickup system 200.

While the present invention has been described with respect to the preferred embodiments, other modifications and variations may be made without departing from the spirit and scope of the present invention as set forth in the following claims.

What is claimed is:

1. An optical pickup system for reading information signals stored on an optical disk, said system comprising:
   means for generating a light beam including a first and a second polarization component;
   a ¼λ plate for changing the polarization component of the light beam transmitted therethrough;
   optical means for reflecting the first polarization component into a direction of the optical disk through the ¼λ plate and reflecting the second polarization component into a different direction away from the direction of the optical disk to thereby allow only the first polarization component to be used for reading the information signals off the optical disk, wherein the optical means includes a base made of a glass and a phase layer, the phase layer reflecting each of the polarization components into different directions, and said each of the polarization components having different phase angles from each other;
   means for detecting the information signal off the optical disk; and
   an objective lens for focusing the light beam to the optical disk, and converging the light beam reflected from the optical disk on the detecting means via the optical means which is capable of reflecting the second polarization component of the light beam incident thereon to the detecting means, wherein the first polarization component of the light beam reflected from the optical disk is converted to the second polarization component by passing through the ¼λ plate before impinging onto the optical means, thereby allowing the optical pickup system to read the information signals off the optical disk.

2. The optical pickup system of claim 1, wherein the optical means is arranged in such a way that it is inclined at a predetermined angle with respect to an optical axis formed by connecting a central point of the objective lens and a focal point of the objective lens.

3. The optical pickup system of claim 2, wherein the generating means is placed at a position such that the first polarization component of the light beam therefrom is focused by the objective lens at a point along the optical axis after being reflected from the optical means, wherein the light beam is aligned along a first line connecting the generating means with an intersecting point of the optical axis with the phase layer of the optical means.

4. The optical pickup system of claim 3, wherein the detecting means is placed at a focusing point of the second polarization component of the light beam after being reflected from the phase layer, wherein the first component of the light beam reflected from the optical disk is converted into the second polarization component after passing through the ¼λ plate.

5. The optical pickup system of claim 4, wherein the angle between the first and a second line is smaller than 90 degrees, wherein the second line is formed by connecting the center of the detecting means and an intersecting point of the optical axis with the phase layer of the optical means.

6. The optical pickup system of claim 1, further comprising a cylindrical lens for generating an astigmatic aberration when the light beam transmits therethrough.

7. The optical pickup system of claim 6, wherein the ¼λ plate is disposed between the optical means and the objective lens.

8. The optical pickup system of claim 7, wherein the objective lens is disposed between the ¼λ plate and the optical disk.

9. An optical pickup system for reading information signals stored on an optical disk, said system comprising:
- a light source configured to generate a light beam including a first and a second polarization component having different phase angles from each other;
- a beam splitter including a phase layer configured to reflect the first polarization component from the light source in a direction of the optical disk;
- a ¼λ plate configured to change the polarization component of the light beam transmitted therethrough and located between the beam splitter and the optical disk;
- an objective lens configured to focus the light beam to the optical disk and located between the ¼λ plate and the optical disk; and
- means for detecting the information signals off the optical disk,
- wherein the objective lens is further configured to converge a light beam reflected from the optical disk on the detecting means via the ¼λ plate, which converts the light beam reflected from the optical disk into the second polarization component, and via the phase layer which is further configured to reflect the second polarization component into a direction of the detecting means,
- thereby allowing the detecting means to read the information signals off the optical disk.

10. An optical pickup system for reading information signals stored on an optical disk, said system comprising:
- a light source configured to generate a light beam including a first and a second polarization component having different phase angles from each other;
- a beam splitter including a phase layer configured to reflect the first polarization component from the light source in a direction of the optical disk;
- a ¼λ plate configured to change the polarization component of the light beam transmitted therethrough and located between the beam splitter and the optical disk;
- an objective lens configured to focus the light beam to the optical disk and located between the ¼λ plate and the optical disk;
- means for detecting the information signals off the optical disk, and
- a cylindrical lens positioned between the beam splitter and the means for detecting;
- wherein the objective lens is further configured to converge a light beam reflected from the optical disk onto the means for detecting
  - via the ¼λ plate, which converts the light beam reflected from the optical disk into the second polarization component,
  - via the phase layer, which is further configured to reflect the second polarization component into a direction of the means for detecting, and
  - via the cylindrical lens, which generates an astigmatic aberration when the second polarization component from the phase layer is transmitted therethrough, thereby allowing the means for detecting to read the information signals off the optical disk; and
- wherein the light beam generated by said light source impinges on said beam splitter without first passing through said cylindrical lens.

11. The optical pickup system of claim 10 wherein the beam splitter is inclined at a predetermined angle with respect to an optical axis formed by connecting a central point of the objective lens and a focal point of the objective lens.

12. The optical pickup system of claim 11 wherein the first polarization component of the light beam from the light source is focused by the objective lens at a point along the optical axis after being reflected from the beam splitter, and
- wherein the light beam is aligned along a first line connecting the light source with an intersecting point of the optical axis with the phase layer of the beam splitter.

13. The optical pickup system of claim 12 wherein the means for detecting is placed at a focusing point of the second polarization component of the light beam after being reflected from the phase layer.

14. The optical pickup system of claim 13 wherein the angle between the first line and a second line is smaller than 90 degrees, wherein the second line is formed by connecting the center of the means for detecting and an intersecting point of the optical axis with the phase layer of the beam splitter.

* * * * *